United States Patent
Wang et al.

[11] Patent Number: 6,115,499
[45] Date of Patent: Sep. 5, 2000

[54] REPEAT FIELD DETECTION USING CHECKERBOARD PATTERN

[75] Inventors: Fermi Wang, Milpitas; Kourosh Soroushian, Sunnyvale, both of Calif.

[73] Assignee: C-Cube Semiconductor II, Inc., Milpitas, Calif.

[21] Appl. No.: 09/006,760

[22] Filed: Jan. 14, 1998

[51] Int. Cl.$^7$ ................................................. G06K 9/36
[52] U.S. Cl. ................. 382/232; 348/415; 348/439; 382/236
[58] Field of Search ........................... 382/232, 233, 382/236; 348/415, 416, 441, 443, 438, 439

[56] References Cited

U.S. PATENT DOCUMENTS

| | | | |
|---|---|---|---|
| 5,237,397 | 8/1993 | Mighdoll ................................ | 358/426 |
| 5,461,420 | 10/1995 | Yonemitsu et al. ..................... | 358/416 |
| 5,828,786 | 10/1998 | Rao et al. .............................. | 348/415 |
| 5,844,618 | 12/1998 | Horiike et al. ......................... | 348/441 |
| 5,892,550 | 4/1999 | Iwasaki et al. ......................... | 348/443 |

*Primary Examiner*—Bhavesh Mehta
*Attorney, Agent, or Firm*—Proskauer Rose LLP

[57] ABSTRACT

The present invention is directed to a method for encoding an uncompressed digital video bit stream. The video bit stream comprises successive frames, each of which includes one or more odd fields and one or more even fields. Such frames with more than two fields may result from a telecine process as discussed above. The inventive method comprises the steps of capturing successive frames of said video bit stream in an encoder system, determining statistics for each frame to make an encoding decision for the frame, the statistics for each frame being determined in a single field time, using a statistically valid subset of pixels from the frame, and encoding the frame in said encoding system in a manner responsive to said encoding decision to generate an encoded bit stream. In a preferred embodiment of the invention, the statistically valid subset of pixels has a checkerboard pattern. Illustratively, the encoding decision involves dropping a repeated field in a frame and inserting a repeat field flag into the encoded bit stream.

5 Claims, 3 Drawing Sheets ent invention relates to the encoding digital bit streams. In particular, the present invention relates to the detection of repeat fields in the input video bit stream to be encoded. According to the invention, repeat fields are detected in a field time (e.g., 1/60 of a second) rather than a frame time (e.g. 1/30 of a second) as is generally the case in the prior art by using a statistically valid subset of the pixels in a frame. Preferably, the statistically valid subset of pixels has a checkerboard pattern.

BACKGROUND OF THE INVENTION

In performing the compression of video in real-time, one of the major distinguishing factors between one encoding system and the other is the visual quality of the encoded picture once it has been decoded and displayed on a television monitor. Companies spend countless hours trying to develop algorithms for better allocating the quantities of bits to various sections of a video sequence, to try and better represent the picture with the fewest number of bits possible. And in fact, the entire encoding process can, from one point of view, be described as trying to best represent a video sequence in the lowest amount of bits possible.

FIG. 1 shows an exemplary video encoding pipeline 12 in which a sequence of frames are supplied from a video source 14. The sequence of frames may be progressive or interlaced. A progressive sequence may have a frame rate on the order of 30 frames per second with a single field in each frame. An interlaced sequence generally includes two fields in each frame and therefore will include 60 fields per second at a 30 frames per second frame rate. The interlaced sequence includes an even field corresponding to even scan lines and an odd field corresponding to odd scan lines.

The video source 14 may be any digital video signal source such as a video camera or a telecine machine. A conventional telecine machine converts film with a frame rate of 24 frames per second into a 60 field per second digital video signal using a 3:2 pulldown technique. The 3:2 pulldown technique generates two video fields for a given film frame, three video fields for the next film frame, two fields for the next frame and so on in an alternating 3,2,3, 2,3,2, . . . pattern. However, it should be appreciated that the above alternating pattern may deviate therefrom. For a film frame which is converted into three video fields, the third field is a repeat of the first field. The 3:2 pulldown technique is discussed in greater detail below in connection with FIG. 2.

The video encoding system 12 further includes a video capture buffer 16 for capturing the input video sequence and an inverse telecine circuit 18. The inverse telecine circuit 18 detects repeat fields in the input video sequence and causes these fields to be dropped so as not to waste valuable encoder resources on the compressing of repeat fields. The video encoding system 12 further includes an encoder 20 which may be an MPEG-1 or MPEG-2 compliant encoder. The encoder 20 includes a preprocessor buffer 22, a preprocessor 24, a video compression circuit 26, a rate buffer 28 and a controller 30. In some cases the inverse telecine circuit is part of the preprocessing circuit.

The encoder system of FIG. 1 is represented as a pipeline. In some encoder systems, capture, inverse telecine processing, preprocessing and spatial encoding (i.e., discrete cosine transform, quantization, zig-zag scanning, variable length encoding) are performed by a single Digital Signal Processor (DSP) which operates under the control of an external RISC processor, for example. In this case, pixels make multiple passes through the DSP and are stored in an external SDRAM after each pass.

The video compression circuit 26 receives a video signal from the preprocessor 24 in the form of a sequence of frames or fields and outputs a compressed digital video bit stream. The compressed digital video bit stream output by the video compression circuit 26 may comply with the syntax specified in video compression standards such as MPEG-1 or MPEG-2. The MPEG-2 standard specifies that the encoded bit stream for a frame for which a repeat field has been dropped include a repeat field flag. This permits the decoder to repeat the dropped field without doing extra decode processing. Compression circuits which generate an MPEG-1 or MPEG-2 compliant bit stream are well known. The video bit stream generated by the video compression circuit 26 is stored in the rate buffer 28. The bit stream is then transmitted via a transmission channel 32 to one or more decoders which decode the received bit stream. Alternatively, the bit stream may be transmitted to an electronic or magnetic memory, a recordable optical disk or another suitable storage device.

The controller 30 controls the number of bits allocated by the video compression circuit 26 to the frames to be encoded. The controller 30 allocates bits to the frames to be encoded so as not to exceed the bandwidth in the channel 32 assigned to the encoding system 12 and so as to maintain certain limits on the occupancy of the rate buffer 28. This is turn prevents overflow and/or underflow conditions when the bit stream is received in a decoder buffer from the transmission channel 32 or from a storage device in which the bit stream has been previously stored.

The preprocessor 24 processes the video signal so that it may be compressed by the video compression circuit 26. For example, the preprocessor 24 may change the format of each frame including the number of horizontal or vertical pixels to meet parameters specified by the video compression circuit 16. In addition, the preprocessor 24 can detect scene changes or other changes which increase compression difficulty. A scene change increases the amount of bits required because predictive encoding cannot initially be used. If the preprocessor 24 detects a scene change, this information is communicated to the video compression circuit 26 and controller 30. A fade, representing a continuous decrease or increase in luminance level to or from black over several frames, can also cause difficulties for the video compression circuit 26 because it can cause a failure in motion compensated prediction. The preprocessor 24 can detect and inform the video compression circuit 26 of a fade so that the video compression circuit 26 can take appropriate precautions.

Preprocessing also includes obtaining certain information or statistics about a frame so that certain encoding decisions can be made. For example, it can be decided whether to code a frame as two individual field images or as a single frame image.

FIG. 2 shows a sequence of film frames at 24 frames per second labeled A, B, C, . . . and a corresponding sequence of video fields at 60 fields per second derived from frames A, B, C, . . . using the above-noted 3:2 pulldown technique. A telecine machine which performs 3:2 pulldown conversion alternates between generating three video fields and two video fields for successive film frames. When three video fields are generated for a given film frame, the third field is a repeat of the first field. Thus, as shown in FIG. 2, the first video field $a_1$ is an odd field derived from the first film frame A, the second video field $a_2$ is an even field derived from the film frame A, the third video field $a_3$ is an odd field which is the same as $a_1$ and is derived from the film frame A. The fourth video field $b_1$ is an even field derived from the film frame B and the fifth video field $b_2$ is an odd field derived from the film frame B. The sixth, seventh, and eighth video fields, $c_1$, $c_2$, $c_3$, are even, odd, and even, respectively, and are derived from the film frame C, with $c_3$ being a repeat of $c_1$. The ninth and tenth video fields $d_1$, $d_2$ are odd and even, respectively and are derived from the film frame D. Thus, the number of fields per frame of video follows the 3,2,3, 2,3,2, . . . pattern commonly referred to as a 3:2 pulldown pattern.

The 3:2 pulldown pattern may be interrupted in a variety of situations. For example, there may be an edit operation in which a new film segment is combined with an old film segment. The edit operation may produce the following pattern in which the location of the edit is indicated by an arrow:

$$3, 2, 3, 2, 3, 3, 2, 3, 2, \ldots$$
$$\uparrow$$

In another situation, conventional video can be "spliced" into the 3:2 pulldown video sequence to form a pattern as follows:

$$\ldots 3, 2, 3, 2, 3, 2,\ \ 2, 2, 2, 2, 2, \ldots, 2, 2,\ \ 3, 2, 3, 2, 3, 2, \ldots$$
from film       video       from film This situation occurs when a commercial is inserted into a 3:2 pulldown pattern derived from film. In other situations, there can be a purposeful deviation from the conventional 3:2 pulldown pattern to produce an eye-appealing pan. Moreover, if slow motion is desired there may be repeat fields for optical reasons as well as repeat fields resulting from telecine machine operation.

The purpose of inverse telecine processing may thus be viewed as grouping fields into two-field frames and three-field frames by detecting repeat fields in the field sequence. The repeat fields in the three-field frames are then dropped so as not to waste encoder resources on the compression of repeat fields as indicated above.

FIG. 3A shows a block diagram of an exemplary inverse telecine circuit 52, which is part of an encoder system 50. The system 50 includes, in addition to the inverse telecine circuit 52, an encoder 20 which in this embodiment is compliant with a video compression standard such as MPEG-1 or MPEG-2. The inverse telecine circuit 52 in this embodiment includes a statistics computer 54 and an inverse telecine decider 56. The statistics computer 54 generates field statistics using an input video signal which may comprise source telecine material generated using the above-described 3:2 pulldown technique. The field statistics include metrics designed to extract salient features from the large amount of pixel data that generally characterize repeat fields in the source telecine material. The inverse telecine decider 56 uses a combination of these field statistics to generate decisions regarding repeat fields. The decisions are used to direct the encoder 20 as to which pair of fields of the input video signal should be encoded together as a frame and which fields should be dropped.

The video encoding system 50 may operate in a real-time or non real-time mode. In real-time operation, inverse telecine may be considered a pre-processing stage of an encoding pipeline process. Because the number of field buffers available in a real-time system are limited in practice by memory capacity and throughput signal delay considerations, real-time inverse telecine decisions are generally based on statistics looking ahead only a few fields and statistics associated with past fields. In non real-time operation, multiple processing passes can be made over an entire sequence of source material. The inverse telecine decider 56 can then make decisions based on the statistics computation performed on the entire sequence, and can supply a telecine decision list for the entire sequence to the MPEG encoder 20. This allows non real-time detelecine methods to provide substantially improved decisions relative to detelecine methods that are subject to real-time constraints. In its most basic form inverse telecine processing involves comparing each odd field with the next odd field in the video sequence and each even field with the next even field. These statistics are then used to determine if a next odd field is a repeat of the current odd field and if the next even field is a repeat of the current event field.

FIG. 3B illustrates exemplary field statistics which may be generated by the statistics computer 54 of FIG. 3A for fields in the source telecine material. Fields i and i+2 denote adjacent even fields and fields i+1 and i+3 denote adjacent odd fields in an interlaced sequence of video frames. The exemplary statistics computed for a given field i include:

1. the sum of absolute pixel differences between the field i and its adjacent field of the same parity (denoted $\text{diff}_{13}\ s[i]$);

2. the sum of absolute pixel differences between the field i and its adjacent field of the opposite parity (denoted $\text{diff}_{13}\ o[i]$); and 3. the DC or average value of all pixels of the field i (denoted $dc[i]$).

These statistics may be generated for each of the frames within a given sequence of source telecine material using a computer, microprocessor, application specific integrated circuit (ASIC) or other digital data processor or a portion thereof suitably programmed to perform the specified sum, difference and averaging operations. The computed field statistics are supplied to the inverse telecine decider circuit 56. This circuit decides whether or not there is a repeat field. The operation of such a circuit is disclosed in U.S. patent application Ser. No. 08/608,039, entitled Method and Apparatus for Inverse Telecine Processing, filed for Wilson Kwok, on Feb. 28, 1996, now U.S. Pat. No. 5,821,991 and assigned to the assignee hereof. The contents of this application are incorporated herein by reference. An alternative inverse telecine circuit is disclosed in Casavant, et al., U.S. Pat. No. 5,491,516, issued on Feb. 13, 1996, the contents of which are incorporated by reference.

In addition, to inverse telecine processing, the statistics gathered on a frame prior to the encoding of the frame can be used for a variety of purposes related to the allocations of bits in the encoding process. For example, in an MPEG-2 compliant encoding process, the statistics can be utilized to determine whether to code a frame as a single frame picture or two separate field pictures. The statistics can also be used to determine whether to code a frame as an I, P or B frame, for example, an I frame being used if a scene change is detected. The statistics gathered are also utilized to allocate particular numbers of bits to particular regions in a picture as by controlling the quantizer step size used during a spatial encoding process.

Today certain encoders utilize field length encoding pipelines, which means that during the duration of one video field (1/60th second) about one-half of the picture material of a frame are processed and transformed into the encoded bit stream. In such encoders, careful measures are generally taken to balance the encoder's pipeline so that the amount of processing between two fields is approximately equal. In addition to the processing power, the available amount of memory has to be taken into account in designing the pipeline.

The field-length encoding pipeline poses a challenge for collecting statistics on each video frame, an important part of the encoding process.

In particular, in a field length encoding pipeline there is not enough time to gather and process statistics from an entire video frame. On the other hand, the best results are achieved for such processes as inverse telecine when the statistics are gathered for the entire frame.

In view of the foregoing, it is an object of the invention, to provide a statistics gathering technique for use in a video encoding process which can be accomplished in one field time and yet gives results of comparable quality as when the statistics are gathered for an entire frame. In particular, it is an object of the present invention to provide an inverse telecine process which relies on information gathered in one field time (rather than one frame time) to make an inverse telecine repeat field decision.

SUMMARY OF THE INVENTION

The present invention is directed to a method for encoding an uncompressed digital video bit stream. The video bit stream comprises successive frames, each of which includes one or more odd fields and one or more even fields. Such frames with more than two fields may result from a telecine process as discussed above. The inventive method comprises the steps of:

1. capturing successive frames of said video bit stream in an encoder system;
2. determining statistics for each frame to make an encoding decision for the frame, the statistics for each frame being determined in a single field time, using a statistically valid subset of pixels from the frame; and
3. encoding the frame in said encoding system in a manner responsive to said encoding decision to generate an encoded bit stream.

In a preferred embodiment of the invention, the statistically valid subset of pixels for a frame has a checkerboard pattern.

Illustratively, the encoding decision involves dropping a repeated field in a frame and inserting a repeat field flag into the encoded bit stream.

DETAILED DESCRIPTION OF THE INVENTION

Figure 4:
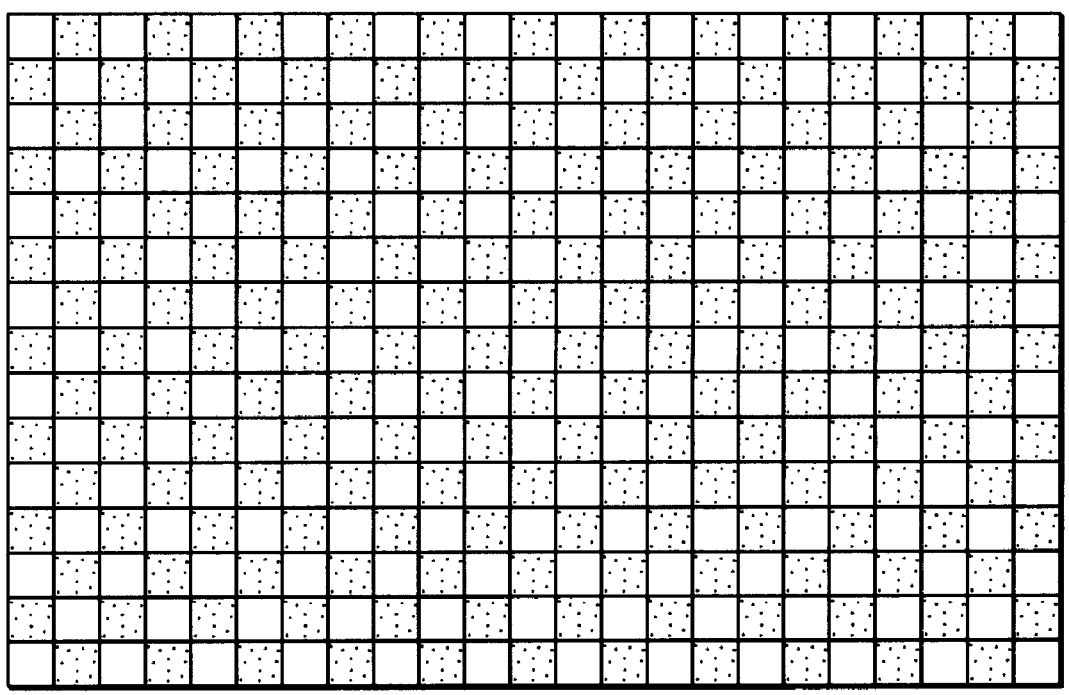
FIG. 4 illustrates a subset of pixels having a checkerboard pattern for use in an encoding method according to the present invention.

FIG. 4 illustrates a frame in a video input frame sequence which is encoded in accordance with an illustrative embodiment of the present invention. Illustratively, the frame has 240 lines of pixels, with 368 pixels per line. The even numbered pixel lines are in an even field and the odd numbered pixels lines are in a odd field. If the frame is output from a source 14 (see FIG. 1) which is a telecine machine it may have a third field which is a repeat of its first field.

Figure 1:
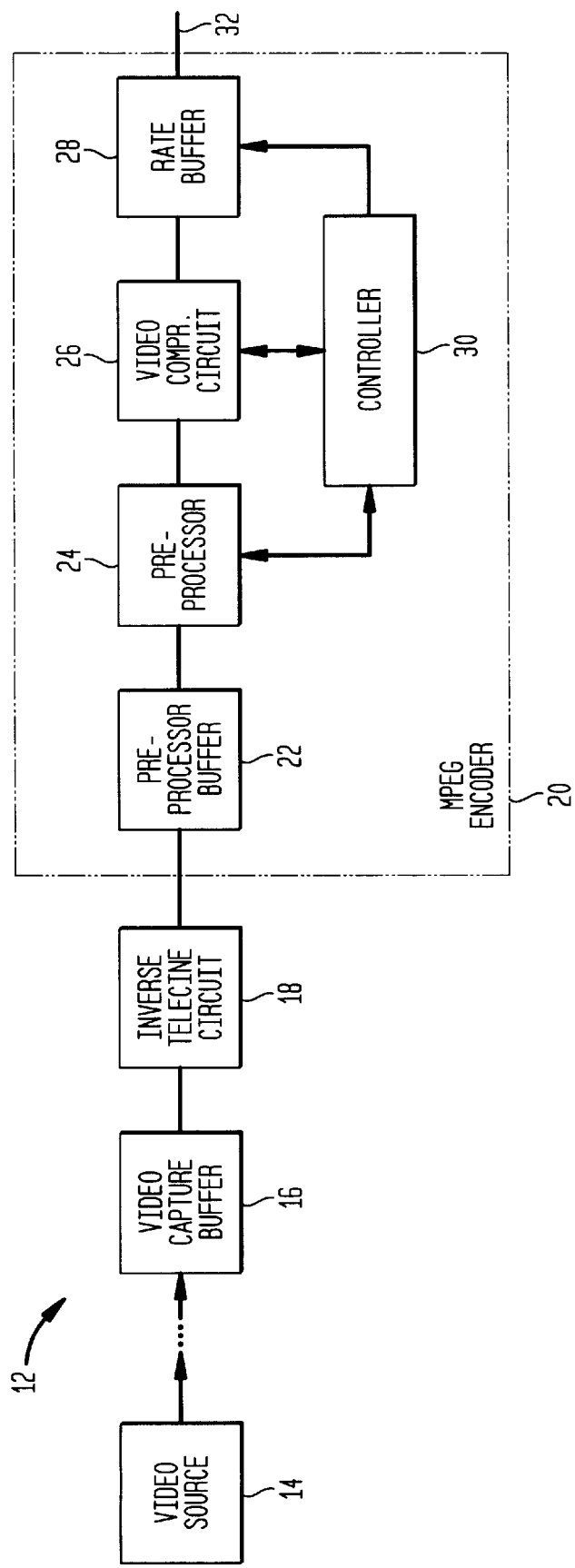
FIG. 1 schematically illustrates an exemplary video encoding pipeline.
Figure 2:
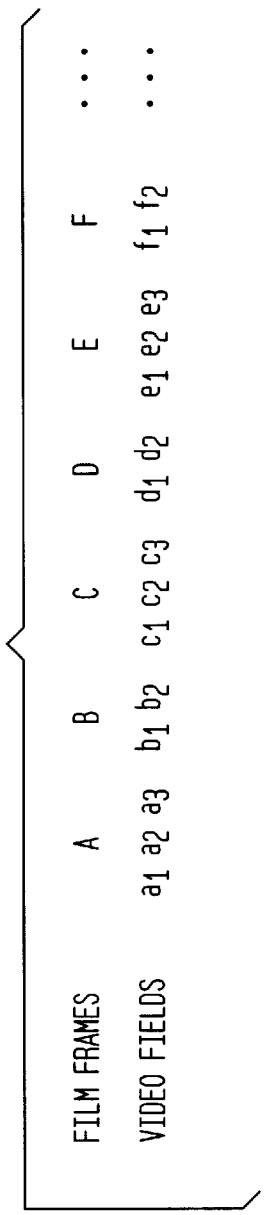
FIG. 2 illustrates a 3:2 pulldown sequence.

In accordance with the invention, the frames in the input sequence are captured in a capture buffer 16 of an encoding system such as that illustrated in FIG. 1.

In an inverse telecine circuit (e.g., 18 of FIG. 1) or preprocessor 24, statistics are gathered from the frame to make certain encoding decisions such as detecting and dropping a repeat field.

It is an important feature of the present invention that the decision be accomplished within one field time which is normally about one sixtieth (1/60) of a second.

It is generally not possible to take statistics from all of the pixels in the frame in this time period to make the decision. Accordingly, a subset of pixels is used which yields a decision of comparable quality as the full set of pixels.

Accordingly, to one embodiment of the invention, a checkerboard pattern is utilized. Such a checkerboard is shown in FIG. 4. Thus, only the pixels in the light boxes are used for the decision but pixels in the dark boxes are not utilized. Illustratively, each box is 16 pixels horizontally and 16 pixels vertically. Alternatively, rectangular boxes with other dimensions may be used or the regions of pixels used in the decision may have shapes other than rectangular.

We have found that making a decision such as repeat field detection using the subset of pixels shown in the checkerboard pattern of FIG. 4 results in a decision which is substantially just as good as a decision made using the entire frame.

For example, in repeat field detection, the following statistics are determined for each frame, by only using the pixels in the checkerboard pattern.

1. the sum of absolute pixel differences between the field i and its adjacent field of the same parity (denoted $diff_{13}$ s[i]);
2. the sum of absolute pixel differences between the field i and its adjacent field of the opposite parity (denoted diff_o[i]); and
3. the DC or average value of all pixels of the field i (denoted dc[i]).

Figure 3A:
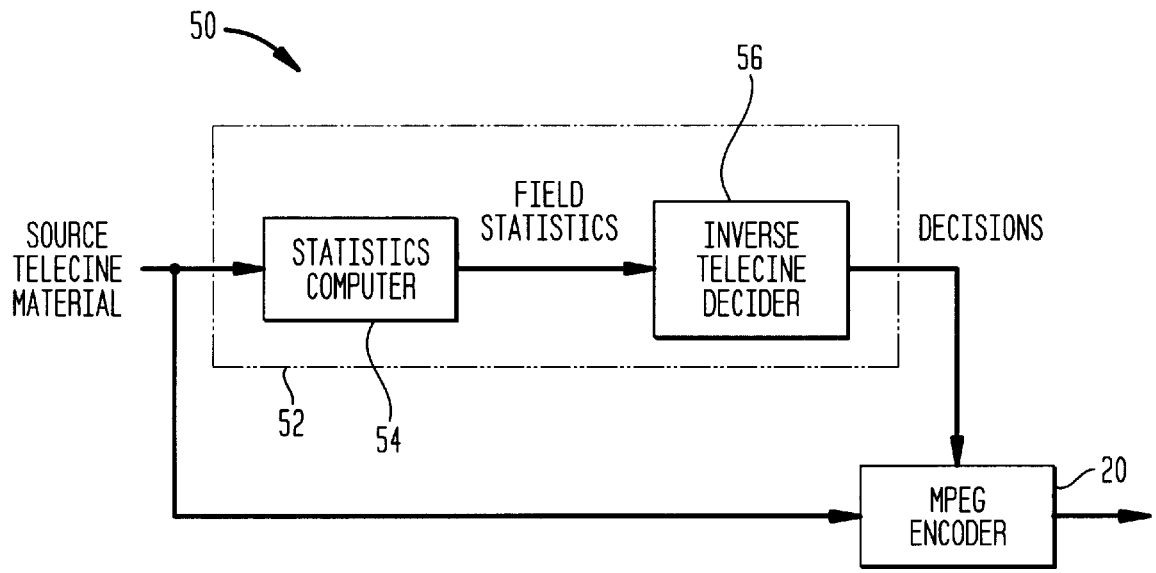
FIG. 3A illustrates an inverse telecine circuit.
Figure 3B:
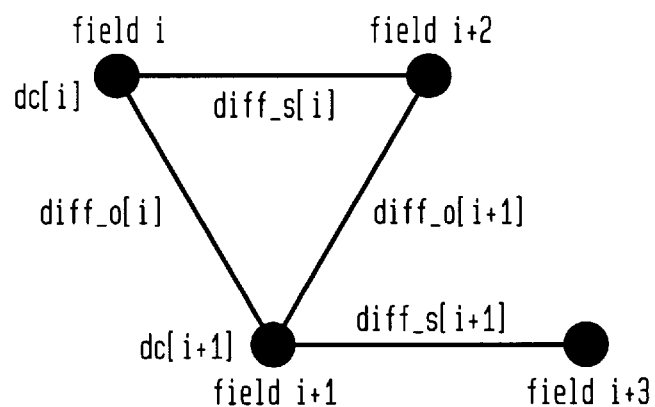
FIG. 3B illustrates statistics which may be gathered for use in inverse telecine processing.

These statistics are determined by a statistics computer such the device 54 of FIG. 3A. These statistics are analyzed using the telecine decider 56. Analysis algorithms are disclosed in the references mentioned above.

Finally, the above-described embodiments of the invention are intended to be illustrative only. Numerous alternative embodiments may be devised by those skilled in the art without departing from the spirit and scope of the following claims.

What is claimed is:

1. A method for encoding an uncompressed digital video bit stream, said video bit stream comprising successive frames each of which includes one or more even fields and one or more odd fields, said method comprising the steps of:

a. capturing successive frames of said video bit stream in an encoder system;

b. determining statistics for each frame to make an encoding decision for the frame, the statistics for each frame being determined in a single field time, using a checkerboard shaped subset of pixels from the whole active region of each field of said frame; and c. encoding the frame in said encoding system in a manner responsive to said encoding decision to generate an encoded bit stream.

2. The method of claim 1, wherein said encoding decision comprises dropping a repeated field in said frame and inserting a repeat field flag into the encoded bit stream.

3. A method of encoding an uncompressed digital video bit stream, said video bit stream comprising successive frames each of which includes one or more even fields and one or more odd fields, said method comprising the steps of:

a. capturing successive frames of said video bit stream in an encoding system;

b. in said encoding system, determining statistics for each successive frame in a single field time to determine if the frame includes a repeat field, the statistics being determined in a field time using a checkerboard shaped subset of pixels from the whole active region of each field of said frame; and c. if one of said frames includes a repeated field, dropping the repeated field, and encoding the frame in the encoding system without the repeated field to generate an encoded bit stream, and inserting a repeat field flag into the encoded bit stream.

4. The method of claim 3, wherein said step of determining statistics includes determining for each pixel in the statistically valid subset of pixels a difference between that pixel and a corresponding pixel of a field of the same polarity.

5. The method of claim 3, wherein one field time is approximately $1/60$ of a second.

* * * * *